(12) United States Patent
Pedretti-Rodi

(10) Patent No.: US 12,116,970 B2
(45) Date of Patent: Oct. 15, 2024

(54) METHOD AND DEVICE FOR STORING ENERGY

(71) Applicant: Energy Vault, Inc., Westlake Village, CA (US)

(72) Inventor: Mauro Pedretti-Rodi, Biasca (CH)

(73) Assignee: Energy Vault, Inc., Westlake Village, CA (US)

( * ) Notice: Subject to any disclaimer, the term of this patent is extended or adjusted under 35 U.S.C. 154(b) by 104 days.

(21) Appl. No.: 17/425,121

(22) PCT Filed: Dec. 11, 2019

(86) PCT No.: PCT/CH2019/050032
§ 371 (c)(1),
(2) Date: Jul. 22, 2021

(87) PCT Pub. No.: WO2020/150840
PCT Pub. Date: Jul. 30, 2020

(65) Prior Publication Data
US 2023/0193871 A1 Jun. 22, 2023

(30) Foreign Application Priority Data

Jan. 23, 2019 (CH) .................................... 00074/19

(51) Int. Cl.
*F03B 13/06* (2006.01)
*F03B 17/02* (2006.01)
*H02J 15/00* (2006.01)

(52) U.S. Cl.
CPC .............. *F03B 13/06* (2013.01); *F03B 17/02* (2013.01); *H02J 15/003* (2013.01); *H02J 15/006* (2013.01); *Y02E 60/16* (2013.01)

(58) Field of Classification Search
CPC .......... F15B 1/045; F15B 1/08; F15B 15/003; F15B 15/006; Y02E 60/16; F03B 13/06
See application file for complete search history.

(56) References Cited

U.S. PATENT DOCUMENTS 3,996,741 A * 12/1976 Herberg .................... F03D 9/28
60/501
4,403,477 A * 9/1983 Schwarzenbach ........ F02C 6/16
60/659

(Continued)

FOREIGN PATENT DOCUMENTS

CN 102686850 9/2012
DE 102011012261 A1 8/2012

(Continued)

OTHER PUBLICATIONS

Lux, Ralph; "International Search Report"; prepared for application No. PCT/CH2019/050032; dated Feb. 5, 2020; 2 pages.

(Continued)

*Primary Examiner* — Michael Leslie
(74) *Attorney, Agent, or Firm* — Knobbe, Martens, Olson & Bear LLP

(57) ABSTRACT

The method according to the invention relates to the storage of energy in the form of a compressed fluid which is pumped into a container (2) arranged below a water surface (4) to store the energy, wherein the fluid entering the container displaces an existing content, comprising water, from the container and into the surrounding water, and compressed fluid is removed from the container (2) to remove energy, wherein surrounding water flows back into the container according to the volume of the removed, compressed fluid, characterized in that the container (2) is provided with flexible walls at least in some parts and is arranged on a seabed (6) or lake bed (6) and there is covered by ballast (15) such that it is pressed against the substrate even when completely filled with compressed fluid.

23 Claims, 4 Drawing Sheets

(56) References Cited

U.S. PATENT DOCUMENTS

Figure 1:
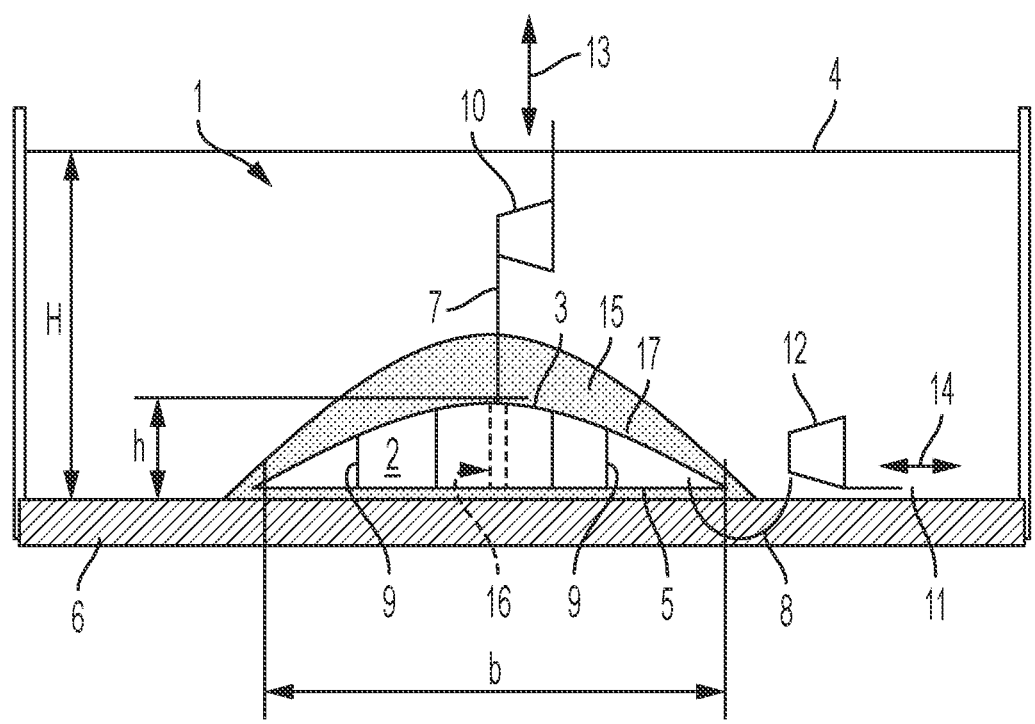

| | | | |
|---|---|---|---|
| 7,743,609 B1 * | 6/2010 | Brostmeyer | F02C 6/16 60/398 |
| 8,904,792 B2 * | 12/2014 | Sigworth, Jr. | F02D 29/06 60/659 |
| 8,950,181 B2 * | 2/2015 | Ivy | B65G 5/00 60/415 |
| 9,494,127 B2 * | 11/2016 | Hongawa | F03B 13/06 |
| 9,557,079 B2 * | 1/2017 | Von Herzen | F24T 10/30 |
| 9,611,867 B2 * | 4/2017 | Ivy | F03G 3/00 |
| 10,344,741 B2 * | 7/2019 | Sant | F03D 13/25 |
| 10,364,938 B2 * | 7/2019 | Frazier | F17C 13/002 |
| 10,707,802 B1 * | 7/2020 | Materna | H02S 20/32 |
| 2010/0307147 A1 | 12/2010 | Ivy et al. | |
| 2011/0169275 A1 | 7/2011 | Garvey | |
| 2017/0314526 A1 | 11/2017 | Farley et al. | |

FOREIGN PATENT DOCUMENTS

| | | |
|---|---|---|
| FR | 3068739 | 1/2019 |
| FR | 3068740 A1 | 1/2019 |
| JP | 5411517 | 1/1979 |
| JP | S5411517 A | 1/1979 |
| JP | 63239319 | 10/1988 |
| WO | 2013119327 | 8/2013 |
| WO | WO-2013/119327 A1 | 8/2013 |

OTHER PUBLICATIONS

"Underwater Energy Storage in Toronto", Toronto Hydro, https://www.youtube.com/watch?v=GicQwXbNnv0, 2 pages.

* cited by examiner

METHOD AND DEVICE FOR STORING ENERGY

The present invention relates to a method for storing energy and a pneumatic energy storage.

The storage of energy by pump storage plants is well known and established. However, there is an increasing need to be able to store energy not only in areas having a corresponding topography, but also where it accrues, for example, in the vicinity of wind power plants or other alternative energy producers. Wind power plants are often available or planned in coastal areas of the sea, solar plants often in coastal areas.

Correspondingly, solutions for storing compressed air have become known, wherein the air is stored below the sea surface, that is, can be stored under the pressure of the surrounding water.

One of these solutions provides for balloons made of flexible material to be anchored on the seabed, wherein these balloons are then filled with compressed air from below and are able to inflate and receive compressed air until they are completely filled. These balloons naturally generate considerable buoyancy and must be anchored accordingly. The anchoring is solved such that a grid of ballast containers filled with bulk material is arranged on the seabed, wherein the balloons are fixed to the ballast containers by anchor ropes between said ballast containers. This arrangement is disadvantageous in that the balloons have to be large for industrial use and thus have a very high buoyancy in the filled state, which in turn requires a correspondingly load-bearing structure of the ballast container and its connections. In addition, such balloons are exposed to the ocean current, which not only increases the forces acting on the ballast containers, but also makes it necessary to arrange the balloons in a movable manner at their anchorage and on the supply lines for the compressed air. If the air is to be sufficiently compressed for larger storage capacity, the entire arrangement must be provided at a greater depth. On the whole, the effort then required for competitive energy storage appears too high.

Accordingly, a further solution for storing energy in the form of electricity has become known through the StEnSEA project—"Stored Energy in the Sea" of the Fraunhofer Institute. Concrete containers having a diameter of 30 m and a wall thickness of 3 m are to be positioned at a depth of 600 m to 800 m and connected to a power plant on land via a power line, wherein a storage capacity of 20 MWh per container is provided. Each concrete container has an equalizing pipe that connects its interior with the surrounding sea. When the storage receives the energy to be stored in the form of electricity, water is pumped out of the sphere via an electric pump. If the stored electricity is to be called up, water flows through a turbine into the empty sphere and generates electricity via a generator, which electricity flows back to land via the power line.

Another disadvantage of this concept is that it causes high costs for the industrial storage of energy. The production of a sufficient number of concrete containers having the dimensions and strength mentioned above is expensive, as is their anchoring at a depth of 600 m to 800 m. On the whole, the effort then required appears to thwart competitive energy storage.

Accordingly, it is the object of the present invention to create a method and a device for storing energy that allows comparatively inexpensive storage.

This object is achieved by a method or by a pneumatic underwater energy storage.

Because water is discharged from the container or taken up again therein according to the volume of the compressible fluid supplied or removed from the container of the energy storage, its pressure load is reduced to a minimum that only depends on its construction height but is independent of its location in depth, which allows simple and inexpensive production of the energy storage. Because a turbine is driven by the discharged water, energy is available with which the surrounding water can be pumped back into the container, so that the operation of the energy storage can be energy-neutral up to the efficiency of the pump-turbine arrangement.

If the container is in some parts or completely formed from flexible walls, it can be designed in a particularly simple and inexpensive manner. Because the flexible container is placed on the seabed and is covered by ballast, the anchoring can also be carried out simply and inexpensively, for example, by simply covering the container with the seabed dredged in its vicinity, which does not pose any major problems even at depths of 800 m. The flexible container can absorb local deformations on the bed or through the ballast, which considerably simplifies the construction of an energy storage according to the invention on the bed of a body of water and contributes to the low overall costs of energy storage.

The invention is described in more detail below with reference to the figures.

Figure 2A:
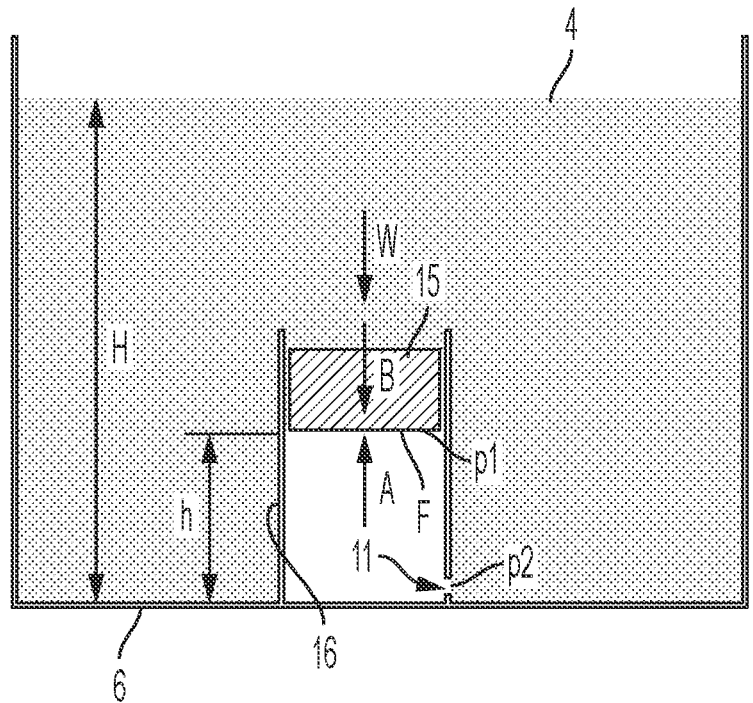
Figure 2B:
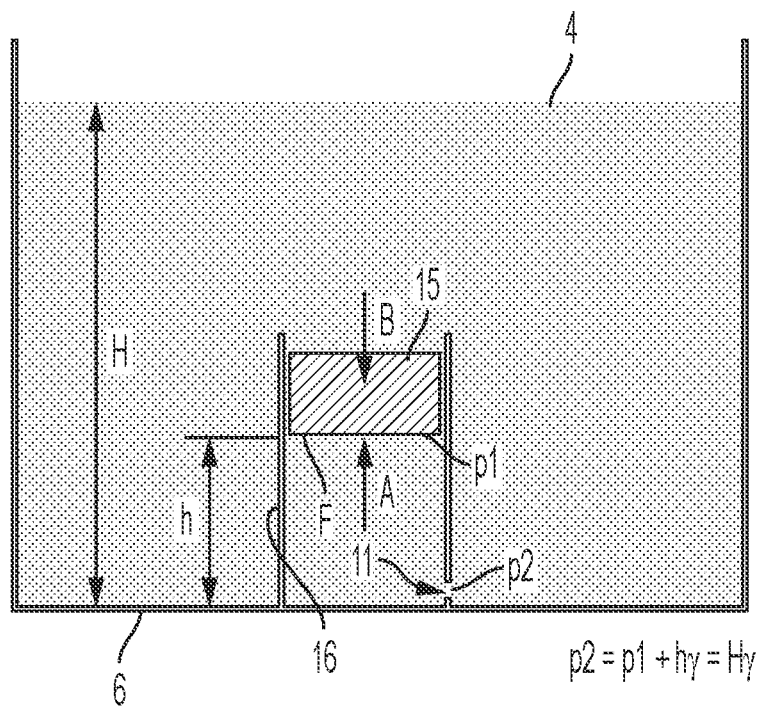
Figure 3:
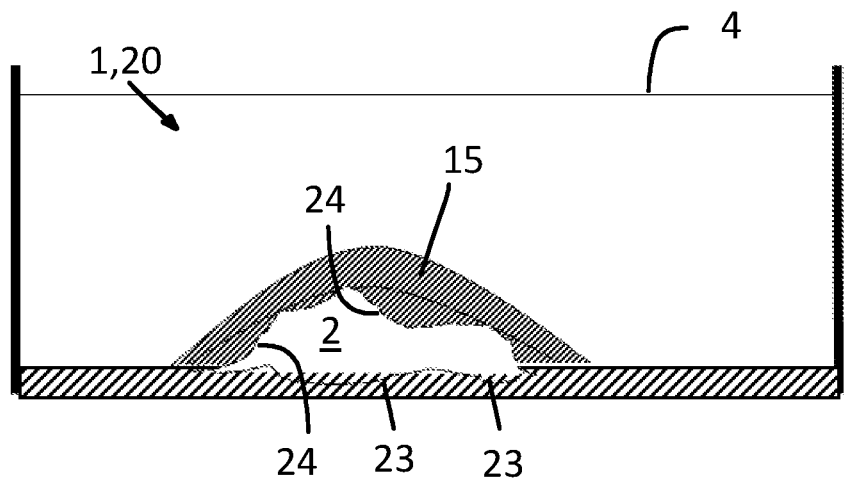
Figure 4:
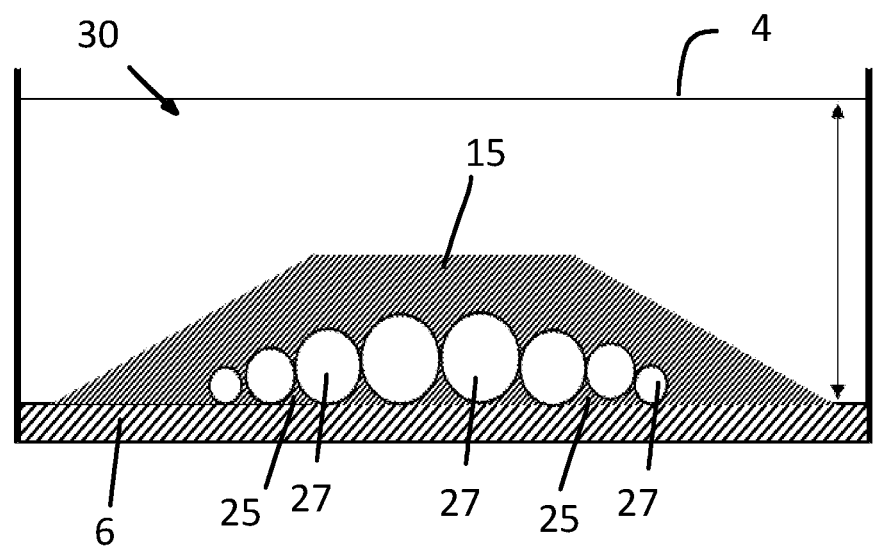
Figure 5:
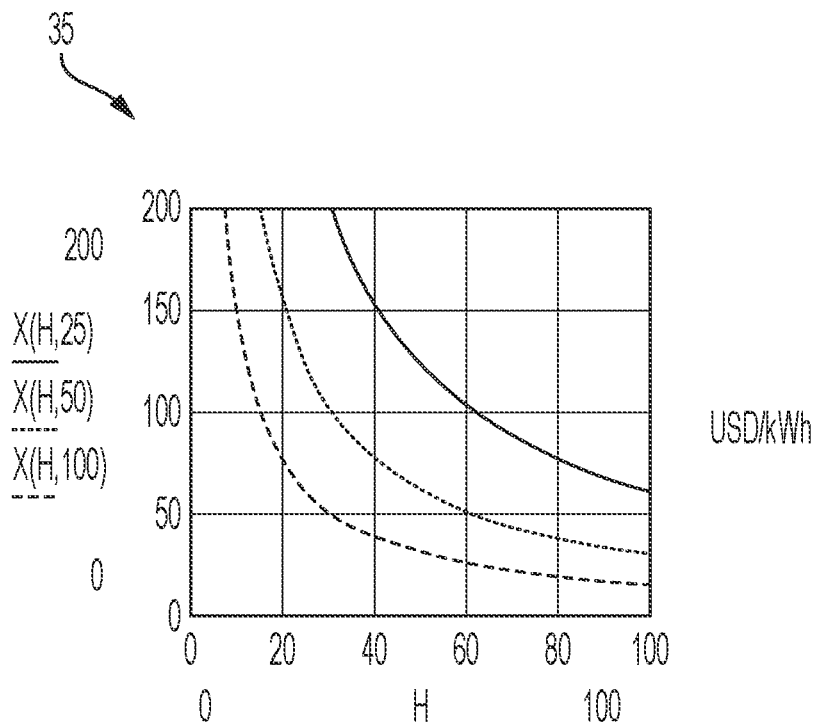
Figure 6:
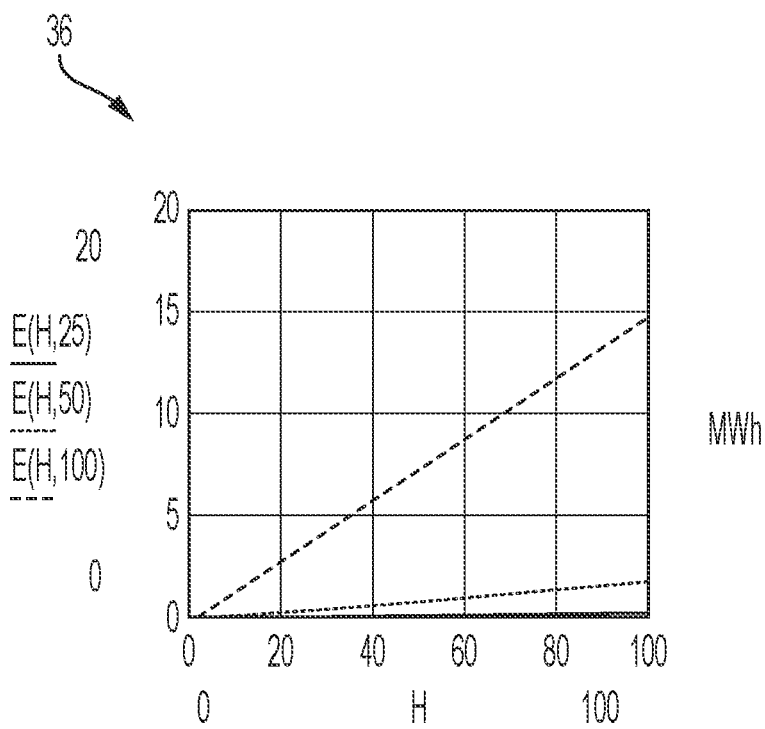

Shown are:

FIG. 1 schematically a pneumatic energy storage according to the invention,

FIG. 2a the pressure conditions in the energy storage according to FIG. 1 when it is filled with compressed fluid, FIG. 2b the pressure conditions in the energy storage according to FIG. 1 when the compressed fluid has been removed therefrom, FIG. 3 schematically the container of the pneumatic energy storage, having flexible walls adapted to the environment, FIG. 4 schematically yet a further embodiment of the pneumatic energy storage according to the invention, FIG. 5 a diagram relating to the costs of the energy storage, and FIG. 6 a diagram relating to the storage capacity.

FIG. 1 schematically shows a cross-section through a preferred embodiment of the pneumatic energy storage 1 according to the invention, having a container 2, wherein all of the container's outer walls 3 are made of a flexible material. The energy storage 1 is located below a water surface 4 and rests with a wall section 5 on the bed 6 of a body of water such as a sea, a lake or a storage reservoir. The flexible walls 3 are preferably formed from a plastic membrane which comprises polyester/PVC, rubber or coated polyester fabric. Other fabrics, for example, with glass fiber, Kevlar or other synthetic fabrics, can also be used. In the specific case, the flexible walls 3 can also be rigid in form in some parts, for example, in the region of the wall section 5 resting on the bottom or at the location of a pressure pipe 7 for compressible fluid to be stored or at the location of an equalizing pipe 8 which connects the container 2 with the surrounding water. However, the entire container 2 is preferably formed by a flexible material.

The pressure pipe 7 is arranged in an upper region of the container 2 and is preferably connected to a compressor-turbine arrangement 10, which is only symbolically shown in the figure, which is more preferably located on land and driven by the energy of a power plant (for example, a solar power plant or a wind power plant or another type of power plant). As a result, a compressor of the compressor-turbine arrangement 10 can, for example, suck in ambient air (or another compressible fluid), compress it and pump it through the pressure pipe 7 into the container 2 to charge the energy storage (1). In addition, for discharging the energy storage (1), a turbine of the compressor-turbine arrangement 10 can be driven by compressed fluid (for example, air) originating from the container 2 and thus generate electricity, for example. To simplify the figure, a valve present in the pressure pipe 7 for the closing or opening thereof has been omitted. However, the double arrow 13 shows the two directions of flow of the compressible fluid through the pressure pipe 7 and through the compressor-turbine arrangement 10. The result is that the interior of the container (2) is preferably provided in an upper region with a pressure pipe (7) for compressed fluid leading to the water surface and, preferably, a turbine (10) is further provided which is driven by the compressed fluid flowing out of the container (2).

The equalizing pipe 8 is arranged on a lower region of the container 2 and has an opening 11 which preferably lies in the region of the height of the wall section 5, that is, in the region of the bed 6 of the body of water. A pump-turbine arrangement 12, which is only shown symbolically here, is further connected to the equalizing pipe 8. The double arrow 14 shows the two directions of flow through the equalizing pipe 8 and the pump-turbine arrangement 12. A valve for closing or opening the equalizing pipe 8 is also not shown in the figure in order to simplify this figure. The pump-turbine arrangement 12 is preferably located on the bed 6 of the body of water, but can also be provided on land, for example, at the location of the compressor-turbine arrangement 10.

The container 2 is covered with ballast 15 such that said container still rests reliably on the bed 6 even when the energy storage 1 is fully charged. The ballast 15 preferably completely covers the container 2, as shown in the figure. More preferably, the ballast 15 consists of bulk material such as gravel or sand, wherein very preferably material from the bed 6, for example, at the location of the energy storage 1, is also or exclusively used for the ballast 15 (it is now possible to dredge the seabed even at a considerable depth and to deposit the material in a targeted manner at low cost).

The container 2 is preferably provided with a flat contour such that its horizontal dimension b is a multiple of its height h, preferably twice or more, particularly preferably three times or more, very particularly preferably five or ten times or more. Such a contour makes it possible, for example, to provide the lens shape indicated in the figure, which is particularly advantageous with regard to the use of bulk material as ballast 15. More preferably, therefore, the inclination of an upper wall section 17 of the container 2 is kept below 30 degrees. It should be noted at this point that the ballast 15 must at least compensate for the buoyancy of the container at every location of the container 2, so that with the lens shape shown in the figure, less ballast 15 is necessary at the edges of the container 2 than in the central region of the container, which is shown by the different thickness of the ballast 15.

In the embodiment shown in FIG. 1, the container 2 is provided with bars 9 which serve to give the container 2 a desired shape or to define its contour. The bars 9 are can preferably be subject to tensile loads and can consist of the same flexible material as the flexible walls of the container 2. In the specific case, the bars 9 are arranged in connection with the ballast 15 provided such that the container 2 retains the intended contour during operation and can be operated with the intended operating volume.

In FIG. 1, an imaginary region 16 of the container 2 can also be seen by the dashed lines, which region extends over the entire height h thereof. The height of the water column of the body of water from the bed 6 to the water surface is H. With the aid of this imaginary region 16, the pressure conditions in the underwater energy storage according to the invention are explained below in the description of FIGS. 2a and 2b.

In an embodiment not shown in the figures, the container 2 of the underwater energy storage is only provided with flexible outer walls 3 in some parts. In the specific case, rigid outer walls 3 can be provided, for example, at the location of the compressed air pipe 7 or the equalizing pipe 8, or also in the bottom or ceiling region of the container 2.

An advantage of the present invention is that the container only has to be designed for a pressure load in the amount of the pressure of a water column from the height h of the container—the depth of the sea or lake bed 6 or the height H up to the water surface 4 thereby plays no role, as mentioned, see the description below for FIGS. 2a and 2b.

It is therefore basically also according to the invention to provide the entire container with non-flexible walls, for example, made of concrete, since only comparatively small wall thicknesses are required (pressure load), even at great depth, which considerably simplifies and makes their production cheaper than containers of the prior art.

The result is a method for storing energy in the form of a compressed fluid which, for storing energy, is pumped into a container (2) arranged below the water surface, wherein the container (2) is arranged on a seabed (6) or a lake bed (6) and is weighted there by ballast (15) such that said container is pressed against the sea or lake bed in the operating position (6) even when it is fully filled by the compressible fluid, and wherein, according to the volume of the compressed fluid entering the container (2), a content of water existing therein is discharged therefrom into the surrounding water, and according to the volume of the compressed fluid removed from the container (2), surrounding water again flows back into the container (2), water discharged from the container (2) is thereby used to drive a turbine and water flowing into the container (2) is pumped therein.

A corresponding pneumatic underwater energy storage has a container (2) for compressible fluid, wherein the container (2) rests on a seabed or lake bed (6) and is covered by ballast (15) such that when fully loaded, said container remains pressed against the seabed or lake bed (6) by the compressible fluid, wherein a pressure pipe (7) for compressible fluid further opens into an upper region of the container (2), and an equalizing pipe (8) provided in a lower region of the container (2) connects the interior of the container (2) with the surrounding water, and wherein a pump-turbine arrangement (12) connected to the equalizing pipe (8) is further provided, which pump-turbine arrangement is designed to discharge water from the container (2) through a turbine into the surrounding water via the equalizing pipe (8) according to the volume of the compressible fluid flowing in during operation of the underwater energy storage (1) and to convey surrounding water by a pump into the container (2) according to the volume of compressible fluid discharged from the container (2).

FIG. 2a shows the imaginary region 16 in the container 2 (see also FIG. 1) when said container is completely loaded with compressed fluid, preferably air. This air generates a buoyancy symbolized by the vector A corresponding to the water it displaces, here corresponding to the volume of the imaginary region 16. If the container 2 is to remain pressed against the bottom by the ballast 15, the weight of the ballast

15 symbolized by the vector B must at least correspond to the buoyancy A, so that its weight corresponds at least to the weight of the water displaced by the air. The vector W symbolizes the weight of the water over the imaginary region 16. F denotes the cross-sectional area of the imaginary region 16.

If $\gamma$ is the specific weight of the water, the result is: The weight of the water is $W=(Hh)F\gamma$, the ballast weight is $B=Fh\gamma$ and is equal to the buoyancy force $A=FH\gamma$ (since the ballast must correspond to the buoyancy). Since the internal pressure of the imaginary region 16 is the same everywhere due to the air content, it is the same in its uppermost region (p1) as below, at the location of the opening 11 (p2), so that $p1=p2=H\gamma$ (the water weight W plus the ballast weight W, that is, $W+B=(H-h)F\gamma+Fh\gamma=FH\gamma$ acts as above).

If the energy storage 1 is filled with compressible fluid, an overpressure prevails therein compared to the surrounding water, which overpressure increases with the height h and corresponds to the pressure in a water column having this height. This overpressure is independent of the depth of the bed 6 or the height H of the water.

FIG. 2b shows the imaginary region 16 in the container 2 when said container has no compressed fluid and is therefore completely filled with water. The pressure p1 remains unchanged, that is, $p1=H\gamma$ (the weight W of the water above the imaginary region 16 and the weight B of the ballast 15 are unchanged—so the internal pressure p1 at the top in the imaginary region 16 is also unchanged). In contrast to the air content of the imaginary region 16 according to FIG. 2a, this is now filled with water, which has a weight $Fh\gamma$. In the imaginary container, there is a water column, the pressure of which increases towards the bottom (per 10 m with approx. 1 bar, depending on the composition of the water). The pressure p2 is then correspondingly higher, namely $p2=p1+h\gamma=H\gamma+h\gamma$. When filled with water, there is an overpressure in the imaginary region 16 at the location of the opening 11 compared to the surrounding water in the amount of $\Delta p=h\gamma$, which is proportional to the height of the water column in the imaginary region 16.

If the energy storage 1 is filled with water, there is an overpressure therein compared to the surrounding water, which corresponds to the pressure in a water column with its height h. This overpressure is independent of the depth of the bed 6 or the height H of the water.

If the container 2 of the energy storage 1 is designed in the shape of a lens, see FIG. 1, the height h is small compared to its width b, that is, its (excessive) compressive stress is low. The ballast 15, when dimensioned appropriately, can absorb this compressive stress, which allows the container 2 to be manufactured from a flexible material that does not have to exhibit any special properties, that is, can be manufactured inexpensively. The bars 9 (FIG. 1) keep the contour of the container 2 in the desired shape.

If compressed air is removed from the container 2 in order to recover energy, the surrounding water flows through the opening 11 into the container 2, wherein the water level therein rises until the state of FIG. 2b is reached. As the water level rises, the overpressure in the container 2 increases, caused by the weight of the increasing water column, so that the surrounding water has to be pumped into the container 2 using the pump of the pump-turbine arrangement 14. When withdrawing energy $E=VH\gamma$ (until all of the stored air has been removed from the container 2), the pump energy $P_p=V(h/2)\gamma$ must be applied at the same time.

If, during the storage of compressed air at the pressure p1, water is discharged from the container 2, when the container 2 is still completely filled with water, this water has the overpressure $h\gamma$, which drops to 0 until the water is completely emptied. According to the invention, the water under overpressure is passed through the turbine of the pump turbine arrangement 14, so that the turbine energy $P_T=V(h/2)\gamma$ is obtained.

This means that the change in the content (water—compressible fluid, here air) of the container 2 takes place in an energy-neutral manner, wherein, however, this is not the case in reality because of the losses in the pump-turbine arrangement 14. These losses are low in relation to the storable energy and represent a negligible cost factor.

It should be noted at this point that, among other things, the weight of the ballast 15 can be set differently by the person skilled in the art in the specific case, for example, with regard to tolerances or safety considerations, etc. than in the calculation for FIG. 2a. In the specific case, the person skilled in the art can easily modify the calculation according to FIG. 2a or 2b accordingly.

As described above, the container 2 preferably alternates back and forth between a state loaded with compressible fluid according to FIG. 2a and a water-filled state according to FIG. 2b, in that the container 2 fills the compressor-turbine arrangement 10 with compressed air, for example, cyclically via the compressor and is emptied again via the turbine. Of course, it is also possible to run the energy storage 1 at an irregular cycle, that is, to only partially fill the container 2 with compressible fluid. The exchange of compressed fluid (air) and water into and out of the container 2 is always volume-neutral, that is, the volume of the water flowing in and out of the container corresponds to the volume of the compressed fluid pumped into or removed from the container 2.

FIG. 3 shows a cross-section through the container 2 of the energy storage 1 or 20 in the operating state, wherein a real deformation of the container 2 is shown somewhat exaggerated compared to the ideal contour for the sake of clarity. To simplify the figure, the pressure pipe 7, the equalizing pipe 8 and the compressor-turbine arrangement 10 (FIG. 1) have been omitted. Flexible wall sections 23 of the container 2 adapt readily to the contour of the sea or lake bed, and upper, flexible wall sections 24 with regard to the ballast 15 and the pressure exerted by the ballast 15 (wherein deformations can also take place during the loading of the container 2 with ballast 15 or during operation during the charging or discharging of the energy storage 1, 20). An expensive, rigid and pressure-resistant design is unnecessary, wherein additionally a container 2 formed by a flexible membrane is not only inexpensive to manufacture, but also inexpensive to position on the seabed and load with ballast.

FIG. 4 shows an alternative arrangement of a plurality of containers 27 of a pneumatic energy storage 30. These containers can be spherical or tubular in form and embedded in a prepared embankment 25 on the seabed or lake bed. In general, such an embankment can be provided in a specific case, for example, in the case of partially rocky or very uneven bed, for example, when it must be assumed that the flexible membrane of the container could be locally overstressed during operation. In turn, it is the case that a possible local embankment is not very cost-intensive compared to other constructions with rigid containers. In the case of most of the sandy formations of the sea or lake bed, it is possible to dispense with embankment.

FIGS. 5 and 6 show an estimate for the costs of the stored energy in diagram 35 and for the amount of energy that can be stored as a function of the water depth in diagram 36. The rough calculation is based on an energy storage according to the present invention, which has a container for compressed air completely formed by a flexible membrane, wherein the container lies on the seabed at a depth of 40 m and is covered by sea sand that has been sucked in by a suction dredger and placed on the container. The inclination of the flexible membrane is 30 degrees at the edge of the container, which is designed in the shape of a lens and has a diameter of 50 m and a maximum height (in the center) of 6.7 m. This results in a total membrane area of 4068 $m^2$ and a maximum storage volume of 6734 $m^3$.

Average polyester/PVC membrane costs at the time of this filing are US$12/$m^2$, resulting in a container cost of US$48,820. As mentioned, sea sand was assumed as ballast material, the laying of which can be set at US$2/$m^3$—a total of US$7,678. Empirical values for the turbine-compressor arrangement lead to costs of US$20/kWh of stored energy. This results in US$76/kWh, wherein the stored energy is 0.75 MWh when the energy storage is fully charged.

Diagram 35 (FIG. 5) graphically shows the energy costs [USD/kWh] as a function of the water depth H [m] for three air reservoir diameters, D=25, 50 and 100 m. Diagram 36 (FIG. 7) graphically shows the stored amount of energy [MWh] as a function of the water depth H [m] for three air reservoir diameters, D=25, 50 and 100 m.

The result is that economic efficiency or competitive industrial use can already be assumed at water depths of 50 m—in contrast to the StEnSEA project (see description above), the concrete storage container of which can only be used economically from a depth of approx. 700 m according to project description specifications.

The invention claimed is:

1. A method for storing energy in the form of a compressed fluid which, for storing energy, is pumped into a container arranged below a water surface, characterized in that the container is arranged on a seabed or a lake bed and is weighted there by ballast such that said container is pressed against the sea or lake bed in the operating position even when it is fully filled by the compressible fluid, wherein, according to the volume of the compressed fluid entering the container, a content of water existing therein is discharged therefrom into the surrounding water, and according to the volume of the compressed fluid removed from the container, surrounding water again flows back into the container, water discharged from the container is thereby used to drive a turbine and water flowing into the container is pumped therein.

2. The method according to claim 1, comprising forming outer walls of the container with a flexible material in some parts.

3. The method according to claim 2, comprising forming all outer walls of the container a flexible material.

4. The method according to claim 1, comprising providing the container with a flat contour such that its horizontal dimension is a multiple of its height.

5. The method according to claim 4, wherein the horizontal dimension of the container is twice or more the height of the container.

6. The method according to claim 5, wherein the horizontal dimension of the container is three times or more the height of the container.

7. The method according to claim 6, wherein the horizontal dimension of the container is five times or more the height of the container.

8. The method according to claim 1, covering the container completely by the ballast.

9. The method according to claim 1, wherein the ballast comprises of bulk material that has been removed from the sea or lake bed at the location of the underwater energy storage.

10. The method according to claim 1, comprising providing the interior of the container in an upper region with a pressure pipe for compressed fluid leading to the water surface, and a turbine is further provided which is driven by the compressed fluid flowing out of the container.

11. A pneumatic underwater energy storage having a container for compressible fluid, characterized in that the container rests on a seabed or lake bed and is covered by ballast such that when fully loaded, said container remains pressed against the seabed or lake bed by the ballast, that a pressure pipe for compressible fluid further opens into an upper region of the container, and an equalizing pipe provided in a lower region of the container connects the interior of the container with the surrounding water, wherein a pump-turbine arrangement connected to the equalizing pipe is further provided, which pump-turbine arrangement is designed to discharge water from the container through a turbine into the surrounding water via the equalizing pipe according to the volume of the compressible fluid flowing in during operation of the underwater energy storage and to convey surrounding water by a pump into the container according to the volume of compressible fluid discharged from the container.

12. The pneumatic underwater energy storage according to claim 11, wherein the container has flexible outer walls at least in some parts.

13. The pneumatic underwater energy storage according to claim 11, wherein the container is formed entirely from flexible walls.

14. The pneumatic energy storage according to claim 11, wherein the ballast completely covers the container.

15. The pneumatic energy storage according to claim 11, wherein the ballast consists of bulk material.

16. The pneumatic energy storage according to claim 15, wherein the bulk material is of the surrounding sea or lake bed.

17. The pneumatic energy storage according to claim 11, wherein the container, in its interior, has bars which can be subjected to tensile loads.

18. The pneumatic energy storage according to claim 11, wherein the pressure pipe for the compressible fluid leads to the surface of the sea or lake, and wherein the pressure pipe is provided with a turbine which can be driven by compressible fluid flowing out of the container.

19. The pneumatic energy storage according to claim 11, the container having a flat contour, a horizontal dimension of which is a multiple of its height.

20. The pneumatic energy storage according to claim 19, wherein the horizontal dimension of the container is twice or more the height of the container.

21. The pneumatic energy storage according to claim 20, wherein the horizontal dimension of the container is three times or more the height of the container.

22. The pneumatic energy storage according to claim 21, wherein the horizontal dimension of the container is five times or more the height of the container.

23. The pneumatic energy storage according to claim 11, wherein it has a plurality of containers which are covered by a common ballast layer.

* * * * *